United States Patent
Ahn et al.

(10) Patent No.: US 10,015,003 B2
(45) Date of Patent: Jul. 3, 2018

(54) COMMUNICATION METHOD SUPPORTING PLURALITY OF SERVING CELLS, AND APPARATUS USING SAME

(71) Applicant: LG ELECTRONICS INC., Seoul (KR)

(72) Inventors: Joonkui Ahn, Seoul (KR); Yunjung Yi, Seoul (KR); Suckchel Yang, Seoul (KR); Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/124,547

(22) PCT Filed: Mar. 16, 2015

(86) PCT No.: PCT/KR2015/002511
§ 371 (c)(1),
(2) Date: Sep. 8, 2016

(87) PCT Pub. No.: WO2015/142008
PCT Pub. Date: Sep. 24, 2015

(65) Prior Publication Data
US 2017/0019243 A1  Jan. 19, 2017

Related U.S. Application Data

(60) Provisional application No. 61/953,943, filed on Mar. 17, 2014.

(51) Int. Cl.
*H04L 5/14* (2006.01)
*H04W 4/70* (2018.01)
*H04W 56/00* (2009.01)
*H04W 4/00* (2018.01)
*H04W 72/04* (2009.01)
*H04L 5/16* (2006.01)
(Continued)

(52) U.S. Cl.
CPC ........... *H04L 5/1461* (2013.01); *H04W 4/005* (2013.01); *H04W 4/70* (2018.02); *H04W 56/00* (2013.01); *H04W 72/044* (2013.01); *H04L 5/16* (2013.01); *H04W 8/22* (2013.01); *H04W 88/08* (2013.01)

(58) Field of Classification Search
CPC ...... H04L 5/1461; H04L 5/16; H04W 72/044; H04W 4/005; H04W 8/22; H04W 88/08
See application file for complete search history.

(56) References Cited

U.S. PATENT DOCUMENTS

| 2012/0327821 A1 | 12/2012 | Lin et al. |
| 2013/0051288 A1 | 2/2013 | Yamada et al. |
| 2013/0083704 A1 | 4/2013 | Gaal et al. |

FOREIGN PATENT DOCUMENTS

WO  2013077554 A1  5/2013

OTHER PUBLICATIONS

"Discussion on full/non-full duplex UE for TDD-FDD CA", 3GPP TSG RAN WG1 Meeting #76, R1-140591, Pague, Czech Republic, Feb. 10-14, 2014.

*Primary Examiner* — Mohammad S Anwar
(74) *Attorney, Agent, or Firm* — Dentons US LLP

(57) ABSTRACT

A communication method supporting a plurality of serving cells in a wireless communication system is provided. A terminal receives a capability enquiry from a network, and accordingly transmits capability information to the network. The capability information comprises an upper band combination and a simultaneous indicator indicating whether the upper band combination supports simultaneous reception (RX)-transmission (TX).

3 Claims, 4 Drawing Sheets

(51) Int. Cl.
*H04W 88/08* (2009.01)
*H04W 8/22* (2009.01)

FIG. 3
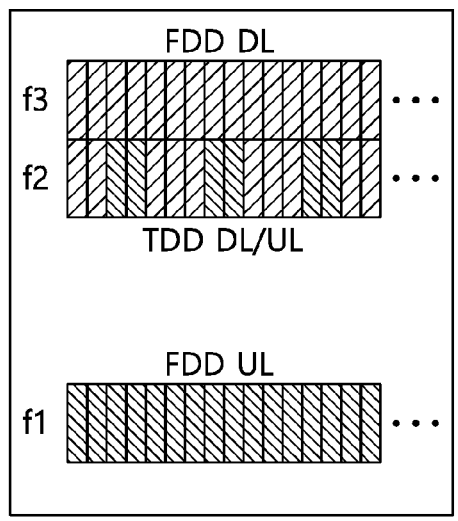
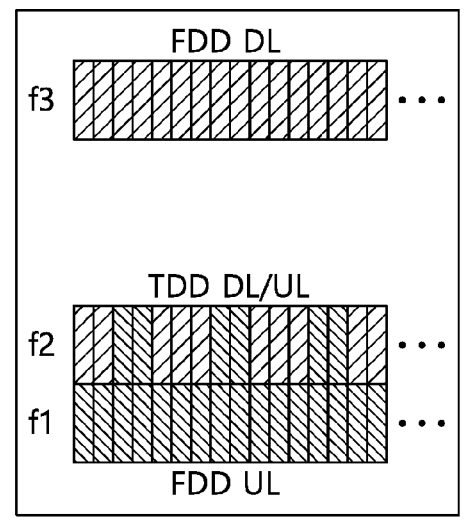
(a) Adjacent FDD DL-TDD carriers    (b) Adjacent FDD UL-TDD carriers

COMMUNICATION METHOD SUPPORTING PLURALITY OF SERVING CELLS, AND APPARATUS USING SAME

This application is a National Phase Application of International Application No. PCT/KR2015/002511, filed on Mar. 16, 2015, which claims the benefit of U.S. Provisional Application No. 61/953,943, filed Mar. 17, 2014, which are hereby incorporated by reference in their entirety for all purposes as if fully set forth herein.

BACKGROUND OF THE INVENTION

Field of the Invention

The present invention relates to wireless communications, and more particularly, to a communication method supporting a plurality of serving cells and an apparatus using the method.

Related Art

The long term evolution (LTE) based on 3rd generation partnership project (3GPP) technical specification (TS) release 8 is widely employed mobile communication standard. Recently, a LTE-advanced (LTE-A) based on 3GPP TS release 10 supporting multiple carriers is under standardization.

In a communication system, a duplex scheme includes a time division duplex (TDD) and a frequency division duplex (FDD). The TDD provides an uplink communication and a downlink communication in the same frequency band. The FDD provides the uplink communication and the downlink communication in different frequency bands.

A user equipment (UE) can support a full duplex or a half-duplex. A full-duplex device supports uplink communication and downlink communication simultaneously. A half-duplex device supports only one of uplink communication and downlink communication at one time.

A carrier aggregation (CA) is a technique capable of providing a plurality of component carriers to the UE. Each component carrier may be defined as one cell. When the plurality of component carriers is configured for the UE, the UE may receive services from a plurality of serving cells.

Each serving cell may be configured with the FDD or the TDD. In a CA environment, the UE may be configured with a plurality of duplex schemes. For example, if two cells are configured for the UE, the cells may be configured as a TDD cell-TDD cell or a TDD cell-FDD cell. Accordingly, a throughput of the UE may be increased in various network environments.

However, since a plurality of duplex schemes is applied to the UE, there may be a problem in an operation for the downlink communication and the uplink communication.

SUMMARY OF THE INVENTION

The present invention provides a communication method supporting a plurality of serving cells, and an apparatus using the method.

In an aspect, a method for communication in a wireless communication system supporting a plurality of serving cells is provided. The method includes receiving a capability enquiry from a network, and transmitting capability information to the network upon receiving the capability enquiry. The capability information comprises a primary band combination and a simultaneous indicator indicating whether the primary band combination supports simultaneous reception (RX)-transmission (TX).

A secondary band combination belonging to the primary band combination may not support the simultaneous RX-TX irrespective of whether the primary band combination supports the simultaneous RX-TX.

If the primary band combination does not support the simultaneous RX-TX, a secondary band combination belonging to the primary band combination may not support the simultaneous RX-TX.

If the primary band combination does not support the simultaneous RX-TX, among band combinations comprising the primary band combination, a band combination except for a band belonging to the primary band combination may support the simultaneous RX-TX.

In another aspect, an apparatus on which a plurality of serving cells are configured in a wireless communication system includes a radio frequency (RF) configured to transmit and receive a radio signal, and a processor operatively coupled to the RF unit. The processor is configured to receive a capability enquiry from a network and transmit capability information to the network upon receiving the capability enquiry. The capability information comprises a primary band combination and a simultaneous indicator indicating whether the primary band combination supports simultaneous reception (RX)-transmission (TX).

When various types of serving cells are configured for a wireless device, a full-duplex operation and a half-duplex operation can be clearly known.

BRIEF DESCRIPTION OF THE DRAWINGS

FIG. 3 shows whether to perform a full-duplex operation according to a band combination.

DESCRIPTION OF EXEMPLARY EMBODIMENTS

Figure 1:
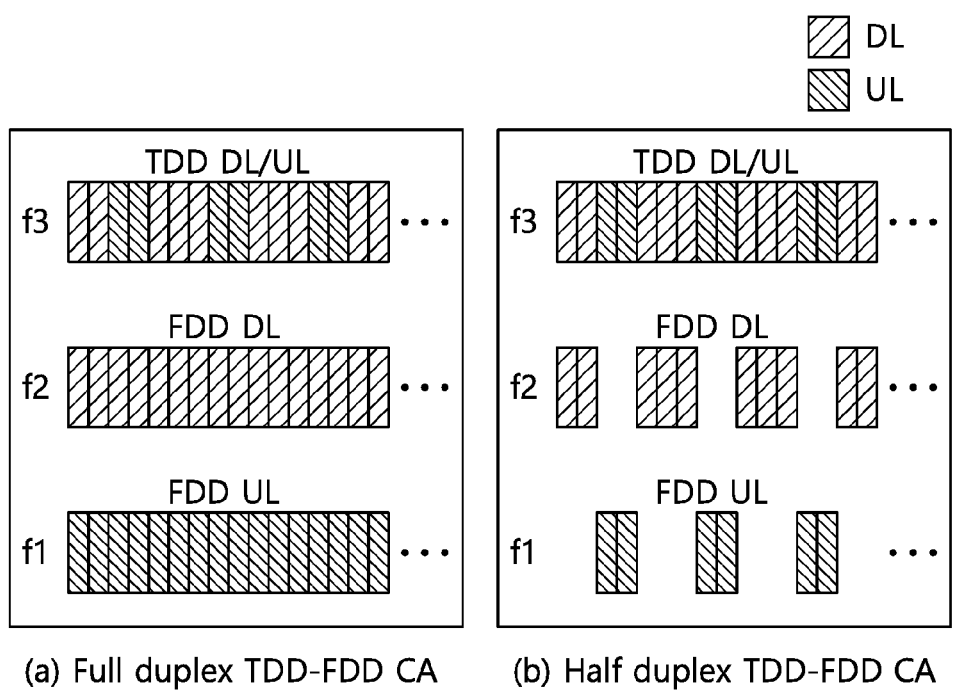
FIG. 1 shows an example of a full-duplex operation and a half-duplex operation.

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE)/LTE-advanced (LTE-A) based on 3GPP TS releases 8-11. This is for exemplary purposes only, and the present invention is also applicable to various wireless communication systems. In the following description, LTE and/or LTE-A are collectively referred to as LTE.

A wireless device may be served by a plurality of serving cells which is managed by one base station. Each serving cell may be defined by one downlink (DL) component carrier (CC) or a pair of a DL CC and an uplink (UL) CC.

A serving cell may be classified into a primary cell (hereinafter referred to as 'PCell') and a secondary cell (hereinafter referred to as 'SCell'). The PCell is a cell which operates at a primary frequency, performs an initial connection establishment procedure, starts a connection reestablishment procedure, or is designated as a PCell in a handover procedure. The PCell refers to a reference cell. The SCell may operate at a secondary frequency, may be configured after a Radio Resource Control (RRC) connection is established, and may be used to provide additional radio resources. Substantially, at least one PCell may be configured, and the SCell may be added/corrected/released according to uplink layer signaling (e.g., radio resource control (RRC)).

A cell index (CI) of the PCell may be fixed. For example, the lowest CI may be designated as the CI of the PCell. Hereinafter, a CI of the PCell is 0, and a CI of the SCell is sequentially allocated from 1.

A serving cell may be a time division duplex (TDD) cell or a frequency division duplex (FDD) cell. The TDD cell provides an uplink communication and a downlink communication in the same frequency band. At specific frequency band, a UL subframe and a DL subframe may co-exist. The FDD cell provides the uplink communication and the downlink communication in different frequency bands. A UL subframe exists at a UL frequency band and a DL subframe exists at a DL frequency band.

In TDD, a DL subframe and a UL subframe co-exists in one subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can know which subframe is a DL subframe or a DL subframe in accordance with the UL-DL configuration.

When a plurality of cells are configured for one wireless device, not only TDD-TDD cells or FDD-FDD cells but also cells having different duplex schemes such as TDD-FDD cells may be aggregated. This is called TDD-FDD carrier aggregation (CA). The TDD-FDD CA can improve a DL/UL peak throughput in various network deployment situations.

The TDD-FDD CA is applicable to not only a full-duplex device but also a half-duplex device at one time instance.

FIG. 1 shows an example of a full-duplex operation and a half-duplex operation.

'f1' is a frequency band for FDD UL, 'f2' is a frequency band for FDD DL, and 'f3' is a frequency band for TDD.

The full-duplex device may simultaneously perform DL reception and UL transmission, and the half-duplex device may perform only one operation between the DL reception and the UL transmission.

A case where the device does not perform a simultaneous reception (RX)-transmission (TX) operation at all in a specific band combination is called for convenience an 'entire half-duplex' operation. A case where the simultaneous RX-TX operation is always possible is called for convenience an 'entire full-duplex' operation.

Figure 2:
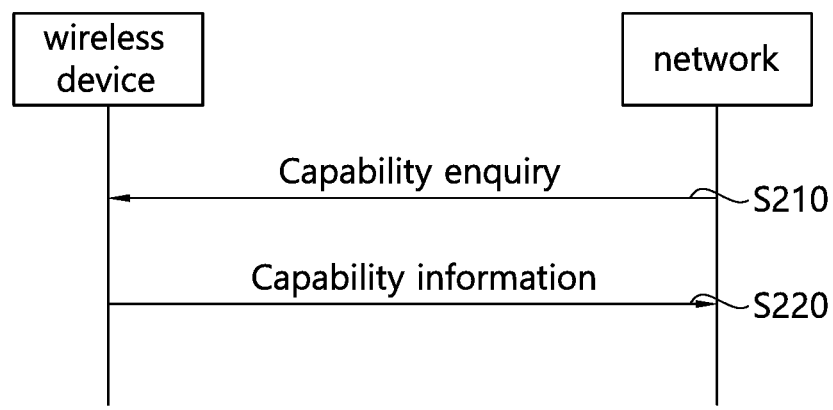
FIG. 2 shows capability information transmission according to an embodiment of the present invention.

FIG. 2 shows capability information transmission according to an embodiment of the present invention.

In step S210, a wireless device receives a capability enquiry message from a network.

In step S220, the wireless device transmits a capability information message from the network. The network may configure a TDD cell and/or an FDD cell for the wireless device on the basis of the received capability information.

The capability information message may include at least one band parameter. The band parameter may include a band combination and a simultaneous indicator indicating whether a simultaneous RX-TX operation is possible for the band combination. For example, if the band combination indicates f1, f2, and f3 and the simultaneous indicator indicates 'true', the wireless device can perform the simultaneous RX-TX operation for the TDD/FDD cell which uses f1, f2, and f3.

Complexity of the wireless device for implementing an RX-TX separation may vary depending on CA band frequency and DL-UL band proximity. Therefore, the wireless device may perform or may not be able to perform the simultaneous RX-TX operation according to a specific band also in a specific band combination.

FIG. 3 shows whether to perform a full-duplex operation according to a band combination.

It is assumed that f1 is a frequency band for FDD UL, f2 is a frequency band for TDD, and f3 is a frequency band for FDD DL.

For example, it is assumed that f2 and f3 are sufficiently adjacent. When it is said that the bands are sufficiently adjacent, it means that it is difficult to perform TX and RX simultaneously since an RX-TX separation is difficult due to complexity of a radio frequency (RF) mode and/or a signal interference or the like. Accordingly, if f2 and f3 are sufficiently adjacent, a wireless device cannot simultaneously perform a TDD UL operation and an FDD DL operation.

For another example, it is assumed that f1 and f2 are sufficiently adjacent. The wireless device cannot perform the TDD DL operation and the FDD UL operation simultaneously.

Hereinafter, a case where the simultaneous RX-TX operation cannot be performed according to a specific band combination in any CA band combinations is called for convenience a 'partial half-duplex' operation.

If whether to perform the simultaneous RX-TX is reported simply for each band combination, whether the simultaneous RX-TX is supported in the specific band combination in the band combinations cannot be signaled. For example, if the band combination indicates f1, f2, and f3 and the simultaneous indicator indicates 'true', the network determines that the wireless can perform the simultaneous RX-TX operation for an TDD/FDD cell which uses f1, f2, and f3. However, an error may occur if f2 and f3 are sufficiently adjacent and the wireless device cannot perform the TDD UL operation and the FDD UL operation simultaneously.

Hereinafter, a band combination for indicating whether to perform the simultaneous RX-TX through the simultaneous indicator is called a primary band combination, and a combination for indicating whether to perform the simultaneous RX-TX in the primary band combination is called a secondary band combination.

In order for the wireless device to report to the network whether the secondary band combination supports the simultaneous RX-TX in the primary band combination, the following method is proposed.

In one embodiment, the wireless device may report whether the simultaneous RX-TX is supported for each secondary band combination included in the primary band combination.

A capability information message includes the primary band combination and its corresponding primary simultaneous indicator. In addition, one or more secondary band combinations and its corresponding secondary simultaneous indicator may be included.

In another embodiment, the wireless device may report a secondary band combination supporting the simultaneous RX-TX in the primary band combination or a secondary band combination not supporting the simultaneous RX-TX.

The capability information message includes the primary band combination and its corresponding simultaneous indicator. In addition, the capability information message may include one or more secondary band combinations not supporting the simultaneous RX-TX in the primary band combination. Alternatively, the capability information message may include one or more secondary band combinations supporting the simultaneous RX-TX in the primary band combination.

Whether the secondary band combination supports the simultaneous RX-TX may vary depending on the simultaneous indicator. If the simultaneous indicator indicates that the primary band combination supports the simultaneous RX-TX, the secondary band combination included in the capability information message may be a combination not supporting the simultaneous RX-TX. On the contrary, if the simultaneous indicator indicates that the primary band combination does not support the simultaneous RX-TX, the secondary band combination included in the capability information message may be a combination supporting the simultaneous RX-TX.

According to another embodiment, the wireless device may implicitly report whether the secondary band combination supports the simultaneous RX-TX.

The capability information message includes the primary band combination and its corresponding simultaneous indicator. In a case where the simultaneous RX-TX is not supported for the primary band combination, if the wireless device indicates that the simultaneous RX-TX is supported through the simultaneous indicator for a band combination including the primary band combination, the wireless device and the network may interpret that the simultaneous RX-TX is not supported for a corresponding primary band combination in a corresponding band combination and the simultaneous RX-TX is supported for band combinations except for the primary band combination included in the band combination.

For example, it is assumed that a first band combination includes f1 and f2, and a second band combination includes f1, f2, and f3. If it is assumed that the simultaneous RX-TX is not supported for the first band combination, the second band combination may interpret that the simultaneous RX-TX is not supported for f1 and f2 among f1, f2, and f3 irrespective of whether the simultaneous RX-TX is supported.

If the simultaneous RX-TX is supported for the first band combination, the wireless device and the network may interpret that the simultaneous RX-TX is supported for the remaining combinations (i.e., f1 and f3, f2 and f3) other than the first band combination included in the second band combination.

If a specific band combination does not support the simultaneous RX-TX, the wireless device and the network may implicitly interpret that the simultaneous RX-TX is not supported for other band combinations included in the specific band combination. Alternatively, the wireless device may report whether the simultaneous RX-TX is supported for other band combinations included in the specific band combination. For example, it is assumed that a capability information message indicating that the specific band combination indicates a combination of f1, f2, and f3 and that the simultaneous RX-TX is not supported is sent by the wireless device to the network. The wireless device and the network may interpret that a band combination having f1 and f2 does not support the simultaneous RX-TX irrespective of whether a simultaneous indicator is received. Alternatively, the wireless device may certainly report, to the network, that the band combination having f1 and f2 does not support the simultaneous RX-TX.

In the aforementioned embodiment, a DL band and UL band in an FDD cell may be treated as one pair or may be treated as separate carriers.

The aforementioned embodiment is also applicable to not only TDD-FDD CA but also TDD-TDD CA and/or FDD-FDD CA.

Figure 4:
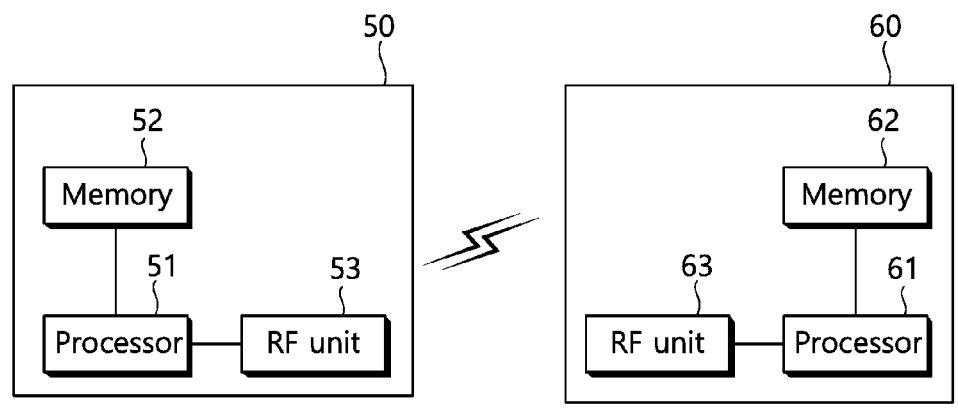
FIG. 4 is a block diagram showing a wireless communication system according to an embodiment of the present invention.

FIG. 4 is a block diagram showing a wireless communication system according to an embodiment of the present invention.

A BS 50 includes a processor 51, a memory 52, and a radio frequency (RF) unit 53. The memory 52 is operatively coupled to the processor 51 to store a variety of information for driving the processor 51. The RF unit 53 is operatively coupled to the processor 51 to transmit and/or receive a radio signal. The processor 51 implements the proposed functions, procedures, and/or methods. In the aforementioned embodiment, an operation of a network may be implemented by the processor 51.

A wireless device 60 includes a processor 61, a memory 62, and an RF unit 63. The wireless device 60 may be a half-duplex device or a full-duplex device. The memory 62 is operatively coupled to the processor 61 to store a variety of information for driving the processor 61. The RF unit 63 is operatively coupled to the processor 61 to transmit and/or receive a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communication in a wireless communication system supporting a plurality of serving cells, the method comprising:
receiving a capability enquiry from a network; and
transmitting capability information to the network upon receiving the capability enquiry,
wherein the capability information comprises a primary band combination and a simultaneous indicator indicating whether a band combination including the primary band combination supports simultaneous reception (RX)-transmission (TX), and
wherein when the simultaneous indicator indicates that the band combination supports the simultaneous RX-TX and when the primary band combination does not support the simultaneous RX-TX, it is implicitly indicated that the simultaneous RX-TX is supported for a secondary band combination except for a band belonging to the primary band combination among the band combination.

2. The method of claim 1, wherein the plurality of serving cells comprise a frequency division duplex (FDD) cell and a time division duplex (TDD) cell.

3. An apparatus on which a plurality of serving cells are configured in a wireless communication system, the apparatus comprising:
a radio frequency (RF) configured to transmit and receive a radio signal; and
a processor operatively coupled to the RF unit and configured to:
receive a capability enquiry from a network; and
transmit capability information to the network upon receiving the capability enquiry,
wherein the capability information comprises a primary band combination and a simultaneous indicator indicating whether a band combination including the primary band combination supports simultaneous reception (RX)-transmission (TX), and
wherein when the simultaneous indicator indicates that the band combination supports the simultaneous RX-TX and when the primary band combination does not support the simultaneous RX-TX, it is implicitly indicated that the simultaneous RX-TX is supported for a secondary band combination except for a band belonging to the primary band combination among the band combination.

* * * * *